Feb. 16, 1960     H. D. FERGUSON, JR     2,925,534
APPARATUS FOR TREATMENT OF GASES
Filed March 11, 1958     2 Sheets-Sheet 1
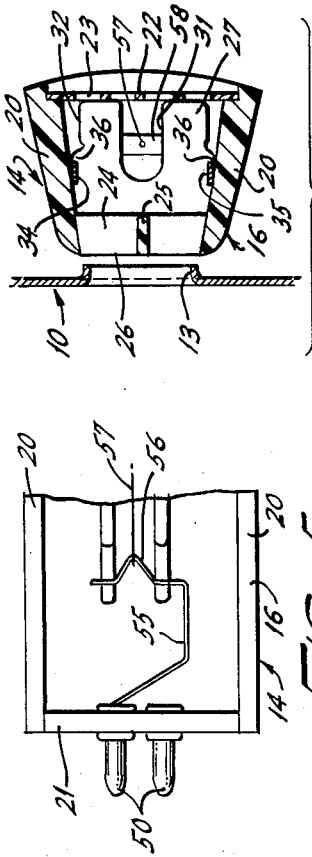
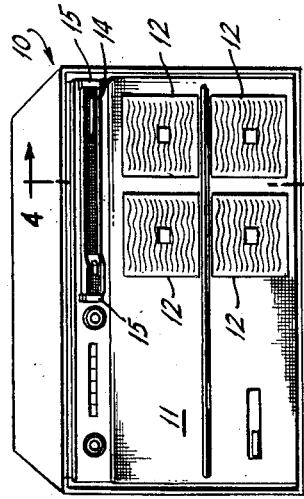
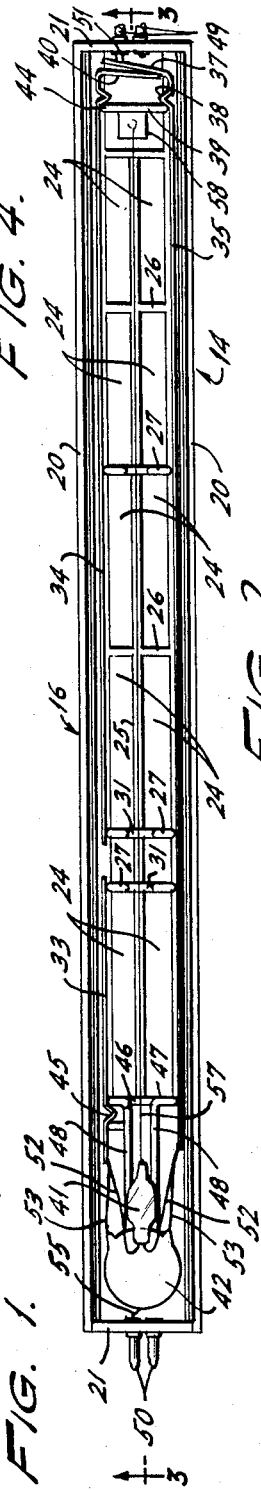
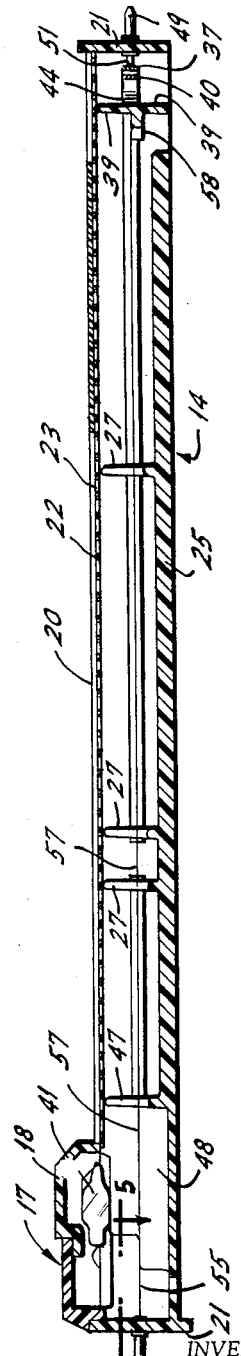
INVENTOR.
HARRY D. FERGUSON JR.
BY
AGENT Feb. 16, 1960    H. D. FERGUSON, JR    2,925,534
APPARATUS FOR TREATMENT OF GASES
Filed March 11, 1958    2 Sheets-Sheet 2
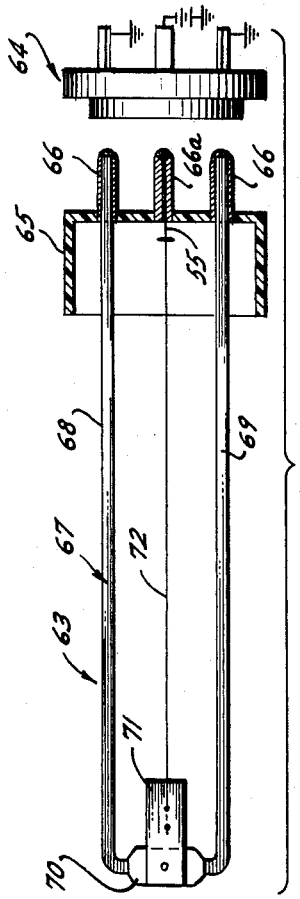
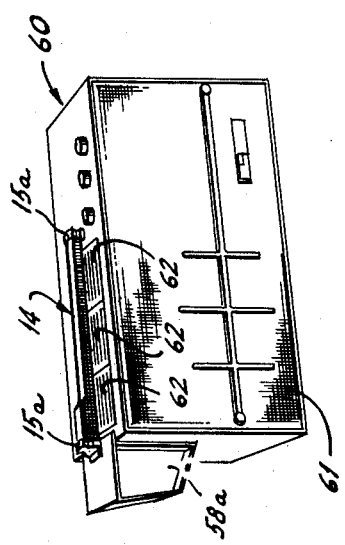
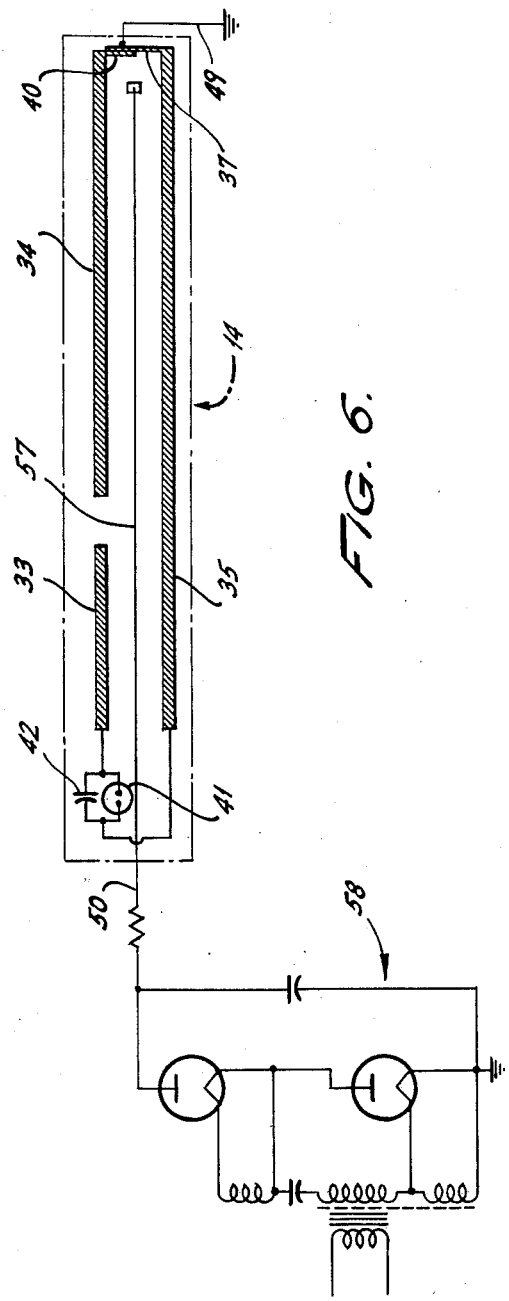
INVENTOR.
HARRY D. FERGUSON JR.
BY
AGENT

United States Patent Office 2,925,534
Patented Feb. 16, 1960

2,925,534

APPARATUS FOR TREATMENT OF GASES

Harry D. Ferguson, Jr., Ambler, Pa., assignor to Philco Corporation, Philadelphia, Pa., a corporation of Pennsylvania Application March 11, 1958, Serial No. 720,652

10 Claims. (Cl. 317—4)

This invention relates to the treatment of gases, and has as its primary objective the maintenance of a predetermined ion level concentration in such gases.

More particularly, it is an object of the invention to provide means for controlling ionization of the atmosphere, in a habitable enclosure, in such manner as to benefit the health and sense of well being of persons within the enclosure. This objective the invention has in common with the invention described and claimed in the copending application of Robert G. Kurtz, entitled "Cleaning and Treatment of Gases," filed March 21, 1957, bearing Serial No. 647,540, and assigned to the assignee of the present invention. As fully described in said copending disclosure, substantial therapeutic benefits may be derived from unipolar (negative) ionization of the air within an inhabited enclosure. Certain ion levels were found to provide the aforementioned benefits, and the apparatus hereinafter to be described and claimed has been designed to operate at or near such levels.

It is an objective of the present invention to provide relatively compact ionizing apparatus.

Another object of the invention is to provide ionizing means in the form of an appliance or attachment which may readily be added to existing air conditioners.

It is an additional objective of this invention to provide, for use in a room air conditioner, ionizing apparatus requiring a minimum of space.

It is another object of the invention to provide ionizing apparatus that is readily accessible and may easily be associated with other equipment.

It is still another object of the invention to provide novel ionizing apparatus for ionizing less than all the air being discharged from an air conditioner.

It is also an object of the invention to provide novel appliance means for use in combination with an air conditioner utilizing a mechanical type filter, affording the advantages of electrostatic dust precipitation.

In accordance with the general features of the invention, there is provided a unitary, compact, separately handleable ionizing unit provided with terminal means adapted for insertion into suitable receptacle means providing for mounting in the path of the conditioned air.

Also to these ends, in accordance with other general features of the invention, there is provided an ionizing unit comprising an electrically non-conductive base member having electrical terminal means extending therefrom. An electrode is supported by the base member, said electrode having elongated substantially parallel portions interconnected by a portion extending transverse said elongated portions. The electrode is further disposed in electrical contact with one of the aforesaid terminal means. An ionizing wire is disposed in cooperable relation with each of the parallel portions of the electrodes and spaced equally therefrom, said wire being disposed in electrical contact with the other of said terminal means.

In the achievement of the foregoing and other objectives the invention proposes, in a preferred embodiment thereof, an ionizing unit comprising an elongated casing, or box-like housing, having perforate opposed walls affording air flow therethrough, when placed in the path of moving air. Electrical terminal means are disposed in end wall portions of the casing, and an ionizing wire extends substantially the length of the casing. This wire is disposed in electrical contact with one of the said terminal means. Electrode means includes portions disposed to either side of said wire. The electrode portions are preferably substantially equi-distant from the wire and are disposed in electrical contact with another of the said terminal means.

Air is caused to flow through the perforate wall portions of the casing, thereby passing through an electrostatic field derived from a suitable potential applied across the ionizing wire and the electrodes. The aforesaid potential is applied through suitable receptacle means disposed in electrical contact with the terminal means, said receptacle means further providing support for the ionizing unit.

It is a feature of the invention, in one aspect thereof, that the casing houses an indicator lamp which is disposed in suitable electrical circuitry with the electrode means.

A better understanding of the invention may be had from a consideration of the ensuing detailed description taken in light of the accompanying drawing, in which:

Figure 1 is a perspective showing of one form of a window-mount type air conditioner embodying the invention;

Figure 2 is a somewhat enlarged elevational showing of the ionizing apparatus of the invention, shown with parts removed;

Figure 3 is a sectional view taken substantially along the line 3—3 of Figure 2;

Figure 4 is an enlarged sectional view through the ionizer and associated cabinet wall, the view being taken substantially in the direction of the line 4—4 of Figure 1;

Figure 5 is an enlarged view looking generally in the direction of line 5—5 as applied to Figure 3;

Figure 6 is a schematic showing of the electrical circuitry of ionizing apparatus embodying the invention;

Figure 7 is a perspective showing of another form of window-mount type air conditioner embodying the invention; and Figure 8 is an elevational showing of a modified ionizer constructed in accordance with the invention.

Referring now to the drawings, and first to Figure 1, one form of a conventional room air conditioner includes an outer cabinet 10, inlet air port in the form of grille 11, and conditioned-air outlet or discharge ports in the form of grilles 12 and a horizontal slot 13 (see Figure 4) disposed in the cabinet 10, each said grille and said port being in fluid flow communication with the conditioned-air duct (not shown). Inasmuch as the invention is not concerned with the air cooling and moving mechanism housed within the cabinet 10, no description thereof will be undertaken.

There is further seen in Figures 1 and 4 a preferred embodiment of an ionizing unit 14 made in accordance with the invention. The ionizing unit 14 is supported opposite the slot 13 by electrical receptacle means 15, as is more fully described in what follows.

Now referring also to Figures 2, 3, and 5 the ionizing unit 14 comprises an electrically non-conductive housing or casing 16 having side walls 20 and end walls 21. Top wall 22, which has been removed in the showing of Figure 2, for purposes of clarity, includes perforations 23. Offset portion 17 formed in wall 22 accommodates indicating means to be hereinafter more fully described. Said means includes a glow-discharge lamp 41, the light from which is visible through window portion 18 of offset 17. The bottom wall includes openings 24 defined by longitudinal rib member 25 extending across transverse ribs 26 and webs 27 interconnecting walls 20.

The openings 24 are so disposed as to overlie the opening 13 formed in the cabinet 10 as best seen in Figure 4. Thus is accommodated conditioned-air flow inwardly of the ionizing unit through openings 24 thence outwardly thereof through perforate wall 22.

As seen to advantage in Figures 2 and 4, each web member 27 has a central open ended slot 31 and a pair of laterally disposed open ended slots 32 cooperatively defined by said web members 27 and said walls 20. Electrode means including elongated conductive strips 33, 34, and 35, preferably of stainless steel, are disposed in slots 32 and are held in place by upset portions 36 formed in the web members. Strip 35 extends substantially the length of the walls 20, and further includes a short leg portion 37 extending transverse thereof. Crimp 38 is formed in the strip 35 and disposed adjacent the web 39. Strip 34 is slightly shorter than strip 35 and similarly includes a short leg portion 40 and a crimp 44 disposed adjacent web 39. Strip 33 is shorter than either of strips 34 and 35, and includes a crimped portion 45 disposed within channel means 46 forming part of web 47, said web including spaced walls 48 extending longitudinally of the housing 16. Oppositely disposed ends of conductive strips 33 and 35 are interconnected by leads 52 and 53 extending, respectively, from a glow-discharge lamp 41 and a capacitor 42, each being disposed in parallel circuitry with respect to one another. Substantially rigid support of the lamp and capacitor is derived from the inherent resilience of their respective lead wires tending to force these elements against walls 48, as a support.

Pins 49 and 50 are disposed respectively in the right and left end walls 21 of the housing 16, as seen in Figures 2 and 3. These pins provide both support of the ionizing unit and electrical connection for electrodes of the unit, said pins being adapted for lateral mounting insertion in known receptacle means. For example, receptacle means of the type commonly used in combination with fluorescent lighting tubes may be used to advantage. One of pins 49 includes an extension 51 which bears against somewhat resilient leg portion 37 of strip 35, said leg portion further bearing against resilient leg 40. The resulting resilient force is opposed by the reaction of web 39 against crimps 38 and 44, thereby ensuring optimum electrical contact between strips 34 and 35 and their terminal pins 49, 51.

One of the left hand pins 50 has attached thereto (see Figure 5) a generally U-shaped spring 55 including crimped portion 56. Ionizing wire 57 is attached to the crimped portion 56, said wire extending between walls 48, through slots 31, to tab 58 formed in web 39. The wire 57 is preferably made of a single .001 inch diameter strand of tungsten. Spring 55 will advantageously accommodate changes in length of the relatively fine wire 57 due, for example, to climatic changes.

Figure 6 illustrates somewhat diagrammatically the manner in which a high electrical potential is impressed across conductive strips 33, 34, 35 and ionizing wire 57, by power pack 58. The circuitry of the indicating means, including the lamp 41 and capacitor 42, is shown as arranged in accordance with the circuit disclosed and claimed in the copending application of Holland S. Lippincott, filed September 12, 1957, bearing Serial No. 683,554, and assigned to the assignee of the present invention.

In the present embodiment strips 34 and 35 are connected by receptacle means 15 and pin 49 to the frame, represented by the "ground" symbol, which is maintained at or near zero potential. Short strip 33 is connected to ground through the indicating means comprising lamp 41 and capacitor 42, each of the latter being connected to ground through conductive strip 35.

Ionizing wire 57 is connected by receptacle 15 and pin 50 to a terminal of the power pack 58 maintained at a negative potential with respect to ground.

In operation of the ionizing unit a portion of the discharged air is caused to flow through slot 13 thence between the ionizing wire 57 and electrodes 33, 34, 35. The remaining major portion of the discharged air flows through discharge grilles 12 and directly into the region or room being cooled. The electrostatic field produced in the ionizing unit is sufficient to ensure production of a preponderance of negatively charged ions and dust particles within the relatively small portion of air being treated at any one instant.

A negative ion is felt to be, characteristically, a small, singly charged particle or molecule when first formed, and this structure is felt further to last only a fraction of a second, whereupon the small ion agglomerates with other particles or molecules or becomes attached to a larger particle of dust, thereby forming larger ions. These small negative ions are readily carried by the discharge air stream into the enclosure being treated. Substantial quantities of the aforementioned larger agglomerated ions and charged dust particles will tend to move at velocities somewhat lower than the velocities of the small negative ions, and these larger ions and particles are caught up by the inlet air stream, where they are readily entrapped in conventional mechanical filter means disposed within the air conditioner. Repeated passes of the air stream over the ionizer will then result in substantially complete removal of the relatively large agglomerated ions and charged particles as soon as they are formed. Entrapment of these dust particles may be enhanced by maintaining the filter means at a potential opposite the sign of the aforesaid ions and particles.

Thus it is seen that the apparatus of the present invention also affords the advantages of air cleaning by electrostatic precipitation.

When the charges built up on electrode strip 33 and capacitor 44 reach such value as to impress a potential across the lamp equal to the glow discharge lamp firing potential, the aforesaid charge is discharged through the lamp, accompanied by a glow thereof. The aforementioned cycle is repetitive in nature and it serves as an indication of proper functioning of the power pack and other circuitry supplying the ionizing unit, as well as of the unit itself.

It will be appreciated that the novel ionizing unit 14 is readily adapted for use with a variety of air conditioners, one having been described above and with particular reference to Figure 1 and another type being seen at 60 in Figure 7, and including air inlet grille 61 and discharge grilles 62. Pack 58a may advantageously include the left hand receptacle 15a, said pack being detachably mounted to the side of the air conditioner. The right hand receptacle 15a may be attached directly to the cabinet, thereby providing the ground terminal for the ionizing unit. The arrangement of the receptacles is such that the ionizing unit 14 mounted therein overlies portions of each discharge grille 62 to accommodate ionization of a portion of the air stream.

The ionizing unit is particularly adapted for installation, in kit form, in most air moving apparatus.

A modification of the invention is shown in Figure 8, without indicator means, and includes an ionizer unit 63 adapted for mounting in a receptacle 64 which provides the ionizing potential through the connections shown. Ionizer unit 63 includes an electrically non-conductive base member 65 having terminal means in the form of pins 66 and 66a extending therefrom and receivable within the receptacle means 64. An electrode 67 is supported by the base member 64 and includes substantially parallel portions 68 and 69 having ends disposed in electrical contact with each of pins 66, said portions being interconnected at the opposite ends by a flattened member 70 extending transverse thereto. An electrically non-conductive tab 71 is affixed to member 70, and there extends between tab 71 and pin 66a ionizing wire means 71 including tensioning spring 55 (see also Figure 5). The ionizing wire means 72 is equally spaced from each of the electrodes 68 and 69.

The embodiment shown in Figure 8 is particularly adapted for installation in a protected position within the confines of the cabinet structure, and may for example be disposed in the discharge air stream in the region of one of the grilles, for example the grilles 12 or 62 of the illustrated cabinets.

From the foregoing description it will be appreciated that the present invention provides apparatus affording both the advantages of air ionization and electrostatic dust precipitation and this with a compact, unitary device adapted for use with air treating apparatus of a variety of types. The apparatus is of such compact nature as to eliminate the need for increasing the overall dimensions of the cabinet, as is required by conventional electrostatic precipitating means including a number of electrodes having considerable extent in the direction of air flow.

To these ends, in summation, it has been shown that, in one aspect thereof, the present invention provides for use in air conditioning equipment unitary means for ionizing the circulating conditioned air comprising ionizing electrode means disposed in an elongated apertured housing adapted for readily disconnectable association with the air conditioning equipment in position such that conditioned air is caused to traverse the housing means and pass over the ionizing electrodes. Positioning of the housing is such that an aperture thereof is so arranged as to overlie an elongated air discharge port means, for example a slot, provided in the aforementioned equipment, thereby to accommodate air flow through the housing. Support of the housing means is advantageously accommodated by electrical terminal means thereof that releasably engages receptacle means provided on exterior portions of the equipment. Thus the ionizing apparatus is readily handleable, as a unit, for cleaning purposes as well as replacement thereof if needed.

I claim:

1. An ionizing unit for the air stream of an air conditioner, said unit comprising: an electrically insulating base member having electrical terminal means extending therefrom; a substantially U-shaped electrode supported by said base member and disposed in electrical contact with one of said terminal means; and an ionizing wire extending substantially parallel to leg portions of said U-shaped electrode, said ionizing wire further being disposed in electrical contact with another of said terminal means.

2. An ionizing unit, comprising: a generally rectangular casing of non-conductive material and including openings at two opposite sides; electrical terminal means extending through end walls of said casing; a plurality of web means extending between side walls of said casing, each said web means having a central open ended slot and a pair of lateral slots equally spaced therefrom, an ionizing wire extending through said central slots and being in electrical contact with one of said terminal means; and electrode means extending through said lateral slots and being in electrical contact with the other of said terminal means.

3. An ionizing unit for the air stream of an air conditioner, said unit comprising: an elongated casing having perforate opposed side walls, said perforate walls affording air flow therethrough; webs having open ended slots and extending between side walls of said casing, the slots associated with each web being equally spaced from one another and presented toward a perforate side of said casing; electrical terminal means disposed in end wall portions of said casing; an ionizing wire extending the substantial length of said casing and through said slots, said wire further being disposed in electrical contact with one of said terminal means; electrode means disposed in slots lying to either side of said wire, each electrode being equi-distant from said wire and in electrical contact with the other of said terminal means.

4. An ionizing unit for the air stream of an air conditioner, said unit comprising: electrically non-conductive base means having a pair of terminal means extending therefrom, said terminal means providing mounting support for said unit; electrode means supported by said base means and having elongated substantially parallel portions interconnected by a portion extending transverse said elongated portions; means providing electrical contact between said electrode means and one of said pair of terminal means; and an ionizing wire substantially coextensive with said electrode means and spaced from said parallel portions, said ionizing wire being disposed in electrical contact with the other of said pair of electrical terminal means.

5. An ionizing unit, comprising: an electrically insulating base member having electrical terminal means; a substantially U-shaped electrode supported by said base member and having leg portions disposed in electrical contact with one of said terminal means; an ionizing wire extending between said base member and an insulating member mounted on the transverse portion of said U-shaped member, said ionizing wire being further disposed parallel to leg portions of the electrode; and means for electrically connecting said ionizing wire to another of said terminal means.

6. In an ionizing unit comprising a box-like housing having top, bottom, side and end walls, said side walls having openings therein, web portions extending between said top and bottom walls, said portions each having a central open ended slot and a pair of open ended slots disposed laterally thereof and electrical terminal means extending through each said end wall, electrode means comprising: a pair of resilient, electrically conductive strips disposed in said lateral slots, said strips being coextensive with said top and bottom walls; crimped portions formed in each said strip adjacent a web portion; leg portions extending from said electrode means, and transversely thereto, being disposed substantially in the same plane and overlying one another, the construction and arrangement being such that one of said leg portions urges the leg portion of the other strip against said terminal means in cooperation with reactive forces provided by the crimped portions being urged against the web portions, thereby to provide electrical contact between said electrodes and said terminal means.

7. An ionizing unit comprising a generally rectangular casing of non-conductive material and including openings at two opposite sides; electrical terminal means extending through end walls of said casing; a plurality of web means extending between side walls of said casing, each said web means having a central open ended slot and a pair of lateral slots equally spaced therefrom; an ionizing wire extending through said central slots and being in electrical contact with one of said terminal means; a first electrode means including a conductive strip extending substantially the length of said casing and including a bent portion extending transversely from one end thereof, said first electrode means further including a conductive strip slightly shorter in length than said casing and having a bent portion extending transversely therefrom and into electrical contact with said bent portion of the first mentioned strip, said bent portions being disposed in electrical contact with said terminal means; a second electrode means including a conductive strip insulated from said first electrode means being disposed in alignment with the mentioned shorter conductive strip; and indicator means comprising a glow discharge lamp and a capacitor disposed in parallel circuitry connecting said second elctrode to said terminal means.

8. Apparatus in accordance with claim 7 wherein said second electrode is connected by said indicating means to said terminal means through the agency of said first electrode means.

9. An ionizing unit comprising: an elongated casing of non-conductive material and having air flow openings in spaced wall portions thereof; a pair of electrical terminal means mounted in spaced relation and each extending from the wall of said casing; an ionizing wire disposed within said casing and extending through at least a major portion of the length thereof; a generally U-shaped resilient wire having one leg portion disposed in electrical contact with one of said terminal means and the other leg portion disposed in electrical contact with said ionizing wire, thereby to tension said ionizing wire and to provide electrical contact of the wire with the said one terminal means; and elongated electrode means supported by said casing, being disposed in intimate contact with wall portions thereof and lying between the mentioned air flow openings, said electrode means extending through at least a major portion of the length of the casing and being disposed in electrical contact with the other of said terminal means.

10. An ionizing unit comprising: an elongated casing of non-conductive material and having air flow openings disposed in spaced wall portions thereof, said openings being adapted to accommodate flow of air transversely through the casing along at least a major portion of the length thereof; a pair of electrical terminal means each disposed at opposed end wall portions of said elongated casing and adapted to provide mechanical support for said unit; an ionizing wire disposed within said casing and extending through at least a major portion of the length thereof, said wire being in electrical contact with one of said terminal means; and elongated electrode means supported by said casing, being disposed in intimate contact with wall portions thereof and lying between the mentioned air flow openings, said electrode means extending through at least a major portion of the length of the casing and being disposed in electrical contact with the other of said terminal means.

References Cited in the file of this patent

UNITED STATES PATENTS

| | | |
|---|---|---|
| 2,318,093 | Penney | May 4, 1943 |
| 2,484,202 | Wintermute | Oct. 11, 1949 |
| 2,585,799 | Lawrence | Feb. 12, 1952 |
| 2,589,613 | Hicks | Mar. 18, 1952 |
| 2,617,761 | Sheer et al. | Nov. 11, 1952 |
| 2,617,860 | Kudelski | Nov. 11, 1952 |
| 2,721,622 | Ditzler | Oct. 25, 1955 |
| 2,756,840 | Mass | July 31, 1956 |

FOREIGN PATENTS

| | | |
|---|---|---|
| 34,597 | Norway | Apr. 10, 1922 |
| 34,384 | Denmark | Mar. 31, 1925 |
| 764,264 | Great Britain | Dec. 19, 1956 |